United States Patent
Spofford et al.

(10) Patent No.: US 9,521,732 B1
(45) Date of Patent: Dec. 13, 2016

(54) WEARABLE MOTION-SIGNALING BAG

(71) Applicant: Girling Kelly Design Group, LLC, Seattle, WA (US)

(72) Inventors: Tucker Jensen Spofford, Seattle, WA (US); Benoit Francois Collette, Seattle, WA (US); Robert Marcus Girling, Woodinville, WA (US); Gavin Morris Kelly, Seattle, WA (US); Sam Baker, Seattle, WA (US); Nicholas James Alto, Seattle, WA (US)

(73) Assignee: Girling Kelly Design Group, LLC, Seattle, WA (US)

( * ) Notice: Subject to any disclaimer, the term of this patent is extended or adjusted under 35 U.S.C. 154(b) by 121 days.

(21) Appl. No.: 14/519,055

(22) Filed: Oct. 20, 2014

(51) Int. Cl.
*H05B 37/02* (2006.01)
*F21V 23/02* (2006.01)
*F21V 33/00* (2006.01)
*G08G 1/16* (2006.01)

(52) U.S. Cl.
CPC ......... *H05B 37/0272* (2013.01); *F21V 23/026* (2013.01); *F21V 33/008* (2013.01); *G08G 1/166* (2013.01)

(58) Field of Classification Search
CPC ............... H05B 37/0272; F21V 23/026; F21V 33/0008; G08G 1/166
USPC ................................. 315/294, 131–133, 153
See application file for complete search history.

(56) References Cited

U.S. PATENT DOCUMENTS

| | | | |
|---|---|---|---|
| 7,263,379 B1* | 8/2007 | Parkulo | G08B 21/02 340/501 |
| 2007/0159808 A1* | 7/2007 | Chen | A45F 3/04 362/103 |
| 2008/0007427 A1* | 1/2008 | Stokes | A41D 19/0157 340/901 |

OTHER PUBLICATIONS

Lee, Myung Su., "SEIL Bag." (2010), Palatine, IL. Retrieved from the Internet: URL:https://www.kickstarter.com/projects/1372886898/seil-bag, [retrieved on Jun. 11, 2014].
Hammerhead., "Find Your Way and Discover New Ones." Retrieved from the Internet: URL:http://hammerhead.io/, [cached on Oct. 14, 2014].
Takahashi, Dean., "Intel Shows Off Lightable Clothing for Bikers." (Sep. 12, 2013), San Francisco, CA. Retrieved from the Internet: URL:http://venturebeat.com/2013/09/12/wearable-biker-clothing/, [retrieved on Jun. 11, 2014].

(Continued)

*Primary Examiner* — Daniel D Chang
(74) *Attorney, Agent, or Firm* — Leonid Kisselev; Patrick J.S. Inouye

(57) ABSTRACT

A wearable motion-signaling bag is provided. The bag includes a housing, one or more straps connected to the housing and shaped to be worn by a user; one or more motion sensors; one or more lights contacting at least one surface of the housing; one or more controls configured to be activated by the user; and a microcontroller operable to execute under programmable control and interfaced to one or more of the sensors, the controls, and the lights, the microcontroller configured to provide signals regarding the motion of the user through the lights based on sensed data from the motion sensors and commands from the capacitive controls. The bag can receive commands from a user device and provide the signals based on the commands.

16 Claims, 5 Drawing Sheets

(56) References Cited

OTHER PUBLICATIONS

Stern et al., "Flora Brake Light Backpack." (Feb. 13, 2013). Retrieved from the Internet: URL:https://learn.adafruit.com/flora-brakelight-backpack, [retrieved on Jun. 11, 2014].
Stern et al., "Citi Bike Helmet: Navigation & Visibility with FLORA!" Retrieved from the Internet: URL:https://learn.adafruit.com/citi-bike-helmet, [retrieved on Jun. 11, 2014].
Bereznak, Alyssa., "This New Gadget is a Mini-GPS for Bicycles, So You Can Stop Writing Directions on Your Hand." (Jan. 9, 2014). Retrieved from the Internet: URL:https://www.yahoo.com/tech/stop-writing-directions-on-your-hand-and-use-this-72729200089.html, [retrieved on Jun. 11, 2014].
Helios Bars., "Transform Any Bike Into a Smart Bike." (2012) San Francisco, CA. Retrieved from the Internet: URL:https://grandst.com/preorder/heliosbars, [retrieved on Jun. 11, 2014].
Nelson, Anders., "Fos—A Truly Wearable, Bluetooth LED Display System." (2013) San Francisco, CA. Retrieved from the Internet: URL:https://www.kickstarter.com/projects/erogear/fos-a-truly-wearable-bluetooth-led-display-system? ref=live, [retrieved on Jun. 11, 2014].
Metcalfe, John., "A Helmet That Automatically Steers You to the Nearest Bike-Share Station."(Jun. 24, 2013) New York. Retrieved from the Internet: URL:http://www.citylab.com/tech/2013/06/helmet-automatically-steers-you-nearest-bike-share-station/5987/, [retrieved on Jan. 29, 2015].

\* cited by examiner

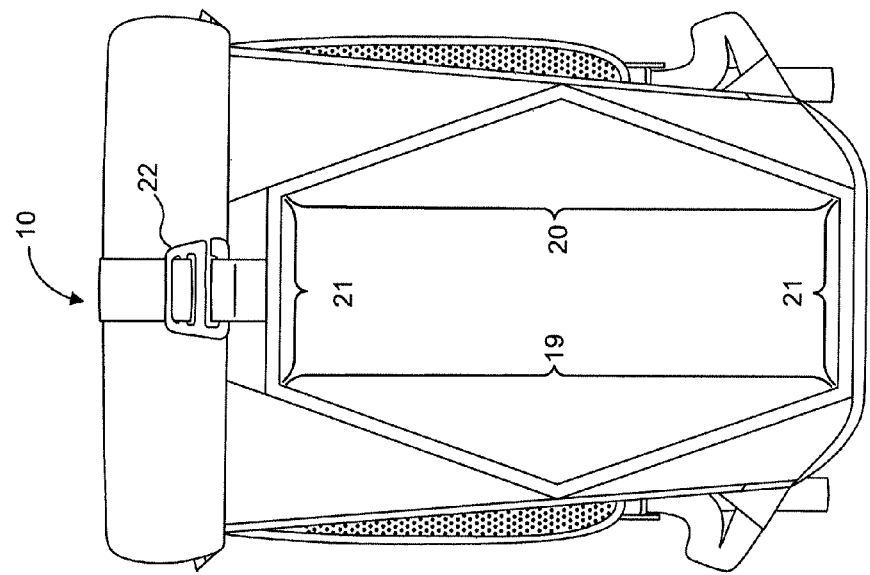
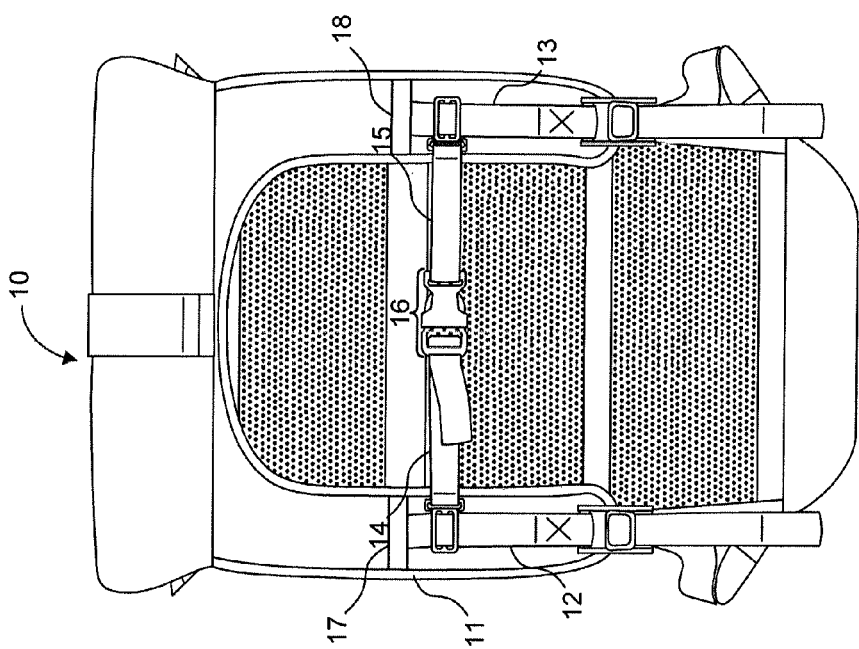
Fig. 1.
Fig. 2.

40

60

WEARABLE MOTION-SIGNALING BAG

FIELD

The present invention relates in general to wearable technology, and in particular, to a wearable motion-signaling bag.

BACKGROUND

Having a bicycle in an urban environment provides a person a way to get to a desired destination while avoiding traffic, getting physical exercise, and protecting the environment. Despite these benefits, urban bicycling also poses significant dangers for the bicyclist. Unlike a car, a bicycle usually does not have built-in lights that notify vehicle drivers of the bicyclist's current or upcoming movements. As a result, generally, bicyclists have to provide these signals personally, such as by using their hands to signal the direction of a turn. Providing such signals can distract the riders from steering their bicycles, increasing the risk of the bicyclists getting into an accident. Further, such signals may be hard to spot for vehicle drivers on the road when visibility is poor, such as during bad weather conditions or at night. In addition, a bicyclist may not be able to convey all necessary signals with his or her hands in a timely manner; for example, a bicyclist may not be able to timely and effectively show that he is slowing down or that his bicycle has broken down. These difficulties in providing signals regarding a bicyclist's movements to others on the road make urban bicycling increasingly dangerous, with the danger being proportional to the number of vehicles on the road.

Current technology is inadequate for dealing with these challenges. For example, the SEIL™ bag, designed by Lee Myung Su Design Lab of Seoul, South Korea, is a wearable bag that includes an LED display visible on the surface of the bag and that can display traffic signals under control of a wireless remote control that can be attached to a bicycle. The signals can be customized through a mobile application. While providing a way for a bicyclist to signal his movements through the LED display, the bag still requires the bicyclist's input for each of the signals to be displayed. Considering that a bicyclist's movements often change during the ride, the requirement for user input means that either the bicycle rider is going to be dangerously distracted during the ride or the rider will not be signaling all of the user's movements.

Similarly, Hammerhead™ designed by Hammerhead Navigation Inc. is a device that attaches to a bicycle and directs the user where to turn based on data received from the user's mobile phone, with the data being based on a route entered into the phone. In addition, the device includes headlights that can provide a light to allow the bicycle to be visible at night. Thus, while Hammerhead, can let others know that the bicycle is on the road and can also provides a bicyclist with directions, the device fails to signal others on the road regarding the bicyclists' movements.

Likewise, FOS, designed by Anders Nelson of San Francisco, Calif., USA, is a fabric patch that contains an LED grid that can be wirelessly programmed from a user's phone. The patch can be attached to a bag or a piece of clothing and can repeatedly display the programmed images. While the patch increases the visibility of the user in general, the patch fails to communicate in real time which direction the user is moving at.

Fraunhofer Institute of Germany has developed a wearable biker clothing that includes LED lights connected to accelerometers to sense where the biker is turning and to signal the turns using the lights. However, such clothing does not give the biker any control over the signals, and provides those signals only once the biker is in motion; thus, other people on the road may not get any advanced warning of the biker's movements.

CycleNav™, produced by Schwinn®, a division of Dorel Industries Inc. of Montreal, Quebec, Canada, is a device that attaches to a front of a bicycle and provides the bicycle rider directions based on the rider's GPS coordinates and a preplanned route on a smartphone application that communicates with the device. However, this device does not signal the rider's movements to others. Similarly, Citi Bike® Helmet designed by Adafruit Industries LLC of New York, N.Y., USA, uses LEDs installed on a helmet to give directions to a bicycle rider to a nearest Citi Bike® station, with the navigation being performed using a GPS and a compass built into the helmet. However, the LEDs on the helmet do not provide clearly-visible signals to others on the road.

Helios Bars™, designed by Helios of San Francisco, Calif., USA, are handle bars that can be installed on a bicycle. The coordinates of the bike can be tracked using a GPS tracker included in the bars, allowing to locate a bicycle with the bars. The bars include an accelerometer and can provide a visual indication on the bars of how fast the user is going by changing their color. However, while the color of the bars can provide the speed to the bicycle rider, the change in color may be hard to spot for drivers on the road, and even if they do spot the change, the change in color of the bike handle bar may not be meaningful to the drivers on the road. Similarly, other information communicated by the bars may not be clearly visible to drivers on the road. The bars are wirelessly connectable to a smartphone, and can receive turn-by-turn navigation directions from the smartphone, which are conveyed via a blinking LEDs mounted on the appropriate side of the bars. The user can also turn on the blinking LEDs by pressing buttons on the bars. However, the light provided by the blinking LEDs may be blocked by the body of the rider, and thus only traffic located in a particular position relative to the rider of the bicycle may see the lights. In addition, the use of Helios Bars requires a bicyclist to make physical changes to his bicycle, installing the bars whose ergonomics may not be suitable for a particular user. Further, the Helios Bars lack brake levers, and their installation can further inconvenience the rider and impair the rider's abilities to operate the bars. In addition, the bars are not suitable for use on any other mode of transportation, such as motorcycle.

The Brake Light™ backpack, developed by Adafruit Industries of New York, N.Y., USA, is a backpack that includes weather-proof lights that can show brake lights and turn signals for a motorcycle rider. The lights can be activated using a wireless remote control, or using an accelerometer that detects when the rider brakes. Operating the remote control can require precise finger movements, creating a significant potential for error and a display of an incorrect turn signal. Further, providing the signal requires constant input from the rider, distracting the rider from the road, and the necessity to operate a remote control can further distract the rider.

Accordingly, there is a need for a way to provide clear, easily interpretable, signals regarding a user's movements without requiring constant attention of the user while allowing the user to take control of the signaling when desired.

SUMMARY

Signals regarding a user's motion can be provided using a wearable motion-indicating object, such as a bag. The bag includes lights that provide clear, easily visible and interpretable signals regarding the user's ongoing movements, such as braking, or upcoming movements, such as upcoming turns. The lights can also provide other signals, such as safety lights, which notify others on the road of the user's presence, and hazard lights. The signals can be animated, making the signals of the bag similar to signals of a car. The bag can provide the signals independently from any other device, basing the signals on commands from the user, which the user can give using controls activated by physical contact with the user, such as capacitive controls, and data from motion sensors included in the bag. The bag can also wirelessly interact with a mobile application running on a user device that has access to the user's preplanned route, and signal the motion based on data received from the application. The bag can also interact with other kinds of user devices.

In one embodiment, a wearable motion-signaling object is provided. The object includes one or more motion sensors configured to sense a motion of a user; one or more lights; one or more controls configured to be activated by the user; and a microcontroller operable to execute under programmable control and interfaced to the sensors, the controls, and the lights, the microcontroller configured to provide signals regarding motion of the user through the lights based on the sensed data from the motion sensors and commands given by the controls when the controls are activated.

In a further embodiment, a wearable motion-signaling bag is provided. The bag includes a housing, one or more straps connected to the housing and shaped to be worn by a user; one or more motion sensors; one or more lights contacting at least one surface of the housing; one or more controls configured to be activated by the user; and a microcontroller operable to execute under programmable control and interfaced to one or more of the sensors, the controls, and the lights, the microcontroller configured to provide signals regarding the motion of the user through the lights based on sensed data from the motion sensors and commands from the capacitive controls.

In a still further embodiment, a system and method for in-route motion signaling are provided. Commands to signal an upcoming movement of a user are generated by a processor of a user device; a wireless transceiver interfaced to the processor transmits the commands to a motion-signaling object wearable by the user, the object including one or more controls, a wireless transceiver configured to receive the user device commands, one or more lights, and a microcontroller operable to execute under programmable control and interfaced to the controls, the wireless transceiver, and the lights. Signals regarding the motion of the user are provided by the microcontroller through the lights based on commands from the controls, and the user device commands.

The wearable motion-signaling object such as the bag, the system, and the method provide the user with a flexible way to signal the user's motion, allowing the user to either rely on the application and the motion sensors to initiate the signaling, or to manually provide signals using the controls. The flexibility allows the user to focus on travelling, such riding a bicycle, but also allows the user to take control of the provided signals when necessary using the controls of the bag, which are easy and intuitive to operate. In addition, the bag allows the user to signal the motion regardless of the mode of transportation that the user is using, allowing the user to use the bag, the system, and the method regardless of whether the user is bicycling, motorcycling, or rollerblading. In addition, the signals provided by the bag make the user similar to cars. Whereas conventionally cars and other traffic on the road may have a hard time anticipating the next move of a bicyclist or another person not driving a car, the signals provided by the bag allows easy interpretation of ongoing and upcoming movements of the user wearing the bag or another motion-signaling object.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIG. 1 is a diagram showing a front view of a motion-signaling bag in accordance with one embodiment.

FIG. 2 is a diagram showing a back view of the motion-signaling bag of FIG. 1 in accordance with one embodiment.

DETAILED DESCRIPTION

Figure 3:
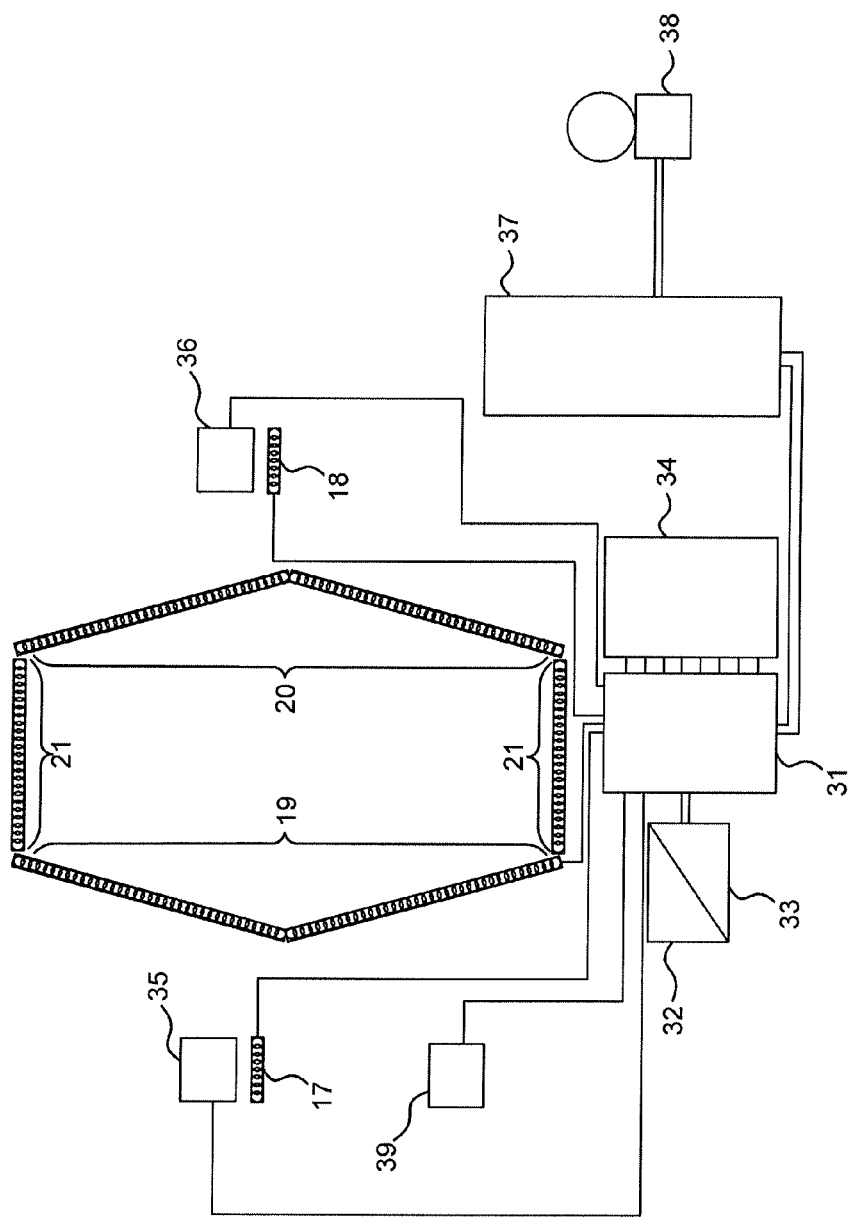
FIG. 3 is a functional block diagram showing the circuitry of the bag of FIG. 1 in accordance with one embodiment.

Signals provided by lights attached to an object worn by a user can be easily seen by drivers on the road who are behind the user and warn the drivers of the motion of the person. Giving the user a freedom to provide these signals either based on a preplanned route, data from motion sensors, or under direct user control allows these signals to be provided in a timely manner and without distracting the user from the road. While the description below includes examples of the described object, the system, and the method being used while the user rides a bicycle, the object, system, and method can also be used for other modes of transportation. Further, while the description below describes the wearable motion-signaling object as a wearable bag, other kinds of wearable motion-signaling objects are possible. For example, the object can be a piece of clothing, such as a jacket, though other kinds of wearable objects are possible.

FIG. 1 is a diagram showing a front view of a motion-signaling bag 10 in accordance with one embodiment. While the bag 10 is shown with reference to FIG. 1 is a backpack, other kinds of bags 10 are possible. For example, the bag 10 could be a messenger bag, though other types of bags are possible. The bag 10 includes a housing 11, which can hold possessions of a user while the user is traveling in one or more openings or pockets, and thus save the user from having to carry additional bags or containers. The housing 11 can be made of any suitable materials, such as a fabric or nylon. Connected to the housing 11 are one or more straps, such as the straps 12, 13, which allow the user to wear the bag 10 on the user's shoulders and which are attached directly to the housing 11. Other types of straps are also possible. For example, the straps 14, 15 can be attached to the straps 12 and 13, and clasp at the user's chest using the buckle 16. Still other types of straps are possible. In a further embodiment, the housing 11 can also be shaped to be mountable to a vehicle associated with the user. For example, the housing 11 can be shaped as a housing of a pannier bag, allowing the bag to be wearable by the user and being mountable to the user's bicycle. The bag 10 retains the functionality described below when mounted to the vehicle and can provide the signals regarding the user's movements.

Attached to the surface of the one or more straps 12-15 or housed within the one or more straps 12-15 can be one or more controls described further below with reference to FIG. 3. In one embodiment, the location of the controls can correspond to the kinds of signal the controls can provide; thus, the control that can command turning on a left turn signal can be located on the left shoulder strap 12 while the control that commands the right signal turn can be located on the right shoulder strap 13. Other locations of the controls, such as on the housing 11, are also possible. The controls can command the lights described further below with reference to FIGS. 2 and 3 and that can be activated by physical contact with the body of the user, such as with the user touching the controls. While the controls are described below as capacitive controls, in a further embodiment other types of controls that can be activated through by physical contact with the user are possible. The activation of the controls by the user commands the lights to signal the user's motion as further described below. The activation of the capacitive controls via touch can be accomplished intuitively, without distracting the user from the road while the user is riding a bicycle or using another mode of transportation. While the housing 11 and the straps 12-15 are shown as having a certain shape with reference to FIGS. 1 and 2, other shapes are also possible.

Figure 4:
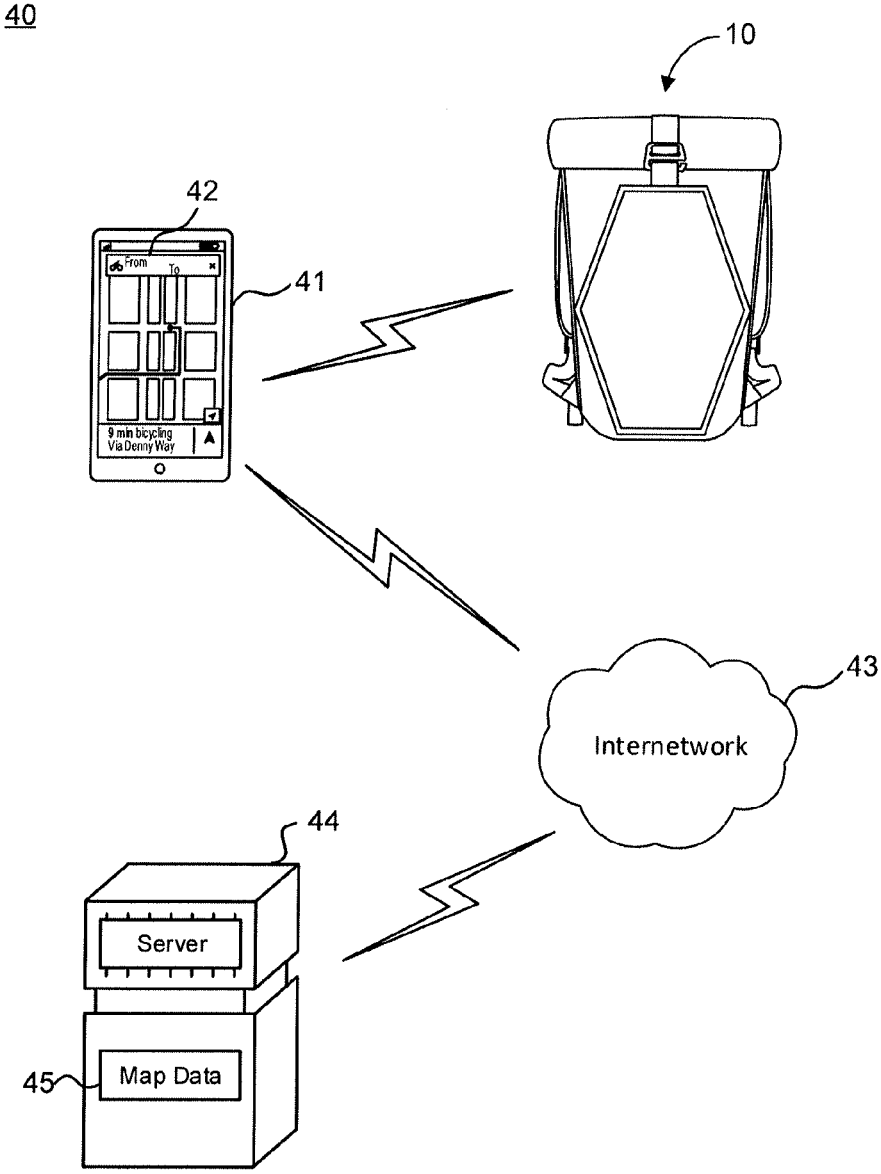
FIG. 4 is a functional block diagram showing a system for in-route motion signaling in accordance with one embodiment.

One or more lights 17, 18, such as LED lights, can be attached to each of the straps 12-15, and can provide information to the user regarding the user's route based on commands received from a user device, as described further below with reference to FIG. 4. For example, by showing an arrow pointing left on the left navigation light 14, the light 14 can direct the user to turn left. The navigation lights 17, 18 can also confirm that the user's commands given by touching the capacitive controls was received. For example, if the user tapped the capacitive control on the left shoulder strap 12 to signal a left turn, the left navigation light 17 would light up. In addition, other indicators of the directions into which the user needs to go can be present on or inside the straps 12, 13, such as vibration motors (not shown), with a vibration of a left and a right motor indicating that the user needs to turn into a left or a right direction respectively. An increased intensity of the vibration of the motors can indicate the increased proximity of the upcoming turn.

While the navigation lights 17, 18 can provide route information to a user, such as a bicycle rider, other portions of the bag 10 are used for the signaling the user's movements to others on the road. FIG. 2 is a diagram showing a back view of the motion-signaling bag 10 of FIG. 1 in accordance with one embodiment. Lights 19-21 are in contact with at least one surface of the housing 11. As shown with reference to FIG. 2, the lights 19-21 can be attached to an external surface of the housing 11. The lights can also be attached to an internal surface of the distal surface of the housing, with light traveling through the material of the housing 11 to signal the user's motion. The lights can be removably attached to the housing 11. For example, in one embodiment, the lights 19-21 can be a part of one or more strips of LED lights. The strips can be a part of a frame, such as a plastic frame. The frame can be removably attached to an internal surface of the housing 11. For instance, the housing 11 can include a pocket into which the frame can be removably placed and secured to an internal surface one of the walls of the housing 11 using Velcro®, though other ways to secure the frame to the wall of the housing are possible. The pocket can be opened and closed by the user, and the frame can be extracted for servicing the lights 19-21 when servicing is necessary, thus extending the service term of the bag 10. Other kinds of contact between the lights 19-21 and one or more surfaces of the housing are possible.

The LED lights can be RGB LED lights, which can produce white light and light of other colors as well. For example, in one embodiment, the RGB Led lights can be the Flora® NeoPixels LEDs manufactured by Adafruit Industries of New York, N.Y., USA. The number of the LEDs in the strip can vary depending on the size of the bag 10; in one embodiment, the lights 19-21 include 192 LEDs, though other numbers of LEDS are possible. Still other kinds of lights are possible. The position of the lights on the distal surface of the housing 11 of the bag 10 allows the lights 19-21 to be seen by drivers behind the user, with the user's body not blocking the signals displayed by the lights.

Turning on different lights in contact with a surface of the housing 11 can provide different signals about the user's motion, with the shapes formed by the lights 19-21 being turned on for each of the signal being easily understandable by others on the road. Further, the signals provided by the lights 19-21 can be animated signals, making them more like signals provided by cars and thus more easily interpretable by motorists. For example, turning on lights 19 provides a left turn signal, which can be shaped as an arrow pointing left along the external surface of the distal side of the housing 11, with the arrow "blinking" when the lights 19 are turned on and off, though other kinds of animation are also possible. Similarly, turning on the lights 20 provides a right turn signal, which can be shaped as an arrow pointing right along the external surface of the distal surface of the housing 11, with the arrow blinking, though other kinds of animation are also possible. Likewise, turning on lights 21 can provide a signal that the user is braking. The braking signal can be shaped as two rectangles, with one of the rectangular shapes provided on the external surface of the distal surface of the housing 11 above the left and right turning signals and the other being provided below the left and right turning signals, as seen with reference to FIG. 2. The braking signal can be animated such as by being "blinked on and off" In a further embodiment, the signals can also be static signals.

The color of the signals can vary, and can be specified by the user as further described below. In addition, the intensity of the signals can vary: for example, the intensity of the braking signal can increase as the user slows down more and more. The variation in intensity can be accomplished by turning on different numbers of lights 19-21 though other ways of varying the intensity are possible. The signals can be provided consistently through their duration or intermittently, with the signals "blinking," being reappearing and disappearing through the duration.

Combinations of the lights 19-21 can provide additional signals. For example, hazard lights can be shown by turning on the lights 19 and 20 at the same time, which the user can accomplish by touching the capacitive controls responsible for providing the left and the right turning signals at the same time. Similarly, the lights 19-21 can provide safety lights, which let other the drivers know of the user's presence. For example, as a cyclist accelerates, the brake signal 21 deactivated and the safety lights, a "moving" pattern of lights that lets others on the road know of the user's presence, can be activated. As can be seen with reference to FIG. 2, the lights 19-21 can form a shape, such as a hexagon, and consecutively turning on and off the lights in the strip adjacent to each other throughout the shape can create the moving pattern of lights, with the animation creating the impression of a light traveling along the edges of the shape. The safety light signal can be deactivated to provide another signal. Other signals are possible.

As mentioned above, the housing 11 of the bag can include one or more openings and pockets for storing the user's possessions. For example, the housing 11 can include a top opening seen with reference to FIG. 2, which is covered by a top lid joined to the rest of the bag by a buckle 22. Other ways the housing can be structured are possible.

The bag 10 includes components that allow the bag 10 to receive commands from the user and other sources. FIG. 3 is a functional block diagram showing a circuitry 30 of the bag 10 of FIG. 1 in accordance with one embodiment. The bag 10 includes a microcontroller 31 that is electrically interfaced with the lights 19-21. In one embodiment, the microcontroller 31 can be Arduino® Uno single-board computer manufactured by Smart Projects Srl of Strambino, Italy; other kind of microcontrollers 31 are possible. The microcontroller 31 can also be interfaced to one or more sensors that sense the motion of the bag 10, and of the user, when the bag 10 is worn. Such sensors can include an accelerometer 32 that senses when the user wearing the bag 10 speeds up and slows down. The sensors can also include a compass 33 that can sense the direction the user wearing the bag 10 is moving in. While the compass 33 and accelerometer 32 can be a part of the same unit, such as in LSM303DLHC 3-axis Compass and Accelerometer manufactured by STMicroelectronics of Geneva, Switzerland, in a further embodiment, the compass 33 and the accelerometer 32 can be separate from each other. Other sensors are possible. For example, a gyroscope (not shown) can sense the direction of the movement and can be in addition or in place of the compass 33. The data from the sensors allows the microcontroller 31 to determine when to turn on one or more of the lights. For example, when the accelerometer 32 provides to the microcontroller 31 data that the user is slowing down, the microcontrollers 31 activates the brake lights 21. Similarly, upon the user starting to accelerate, as indicated by the accelerometer 32, the microcontroller 31 turns on the safety lights.

In a further embodiment, the sensors can be located physically separate from the bag 10. For example, the sensors can be located in a user device described below with reference to FIG. 4 and data from the sensor can be received by the microcontroller 31 over the wireless transceiver.

The microcontroller 31 is also interfaced to a wireless transceiver 34, such as a Bluetooth module, and can receive commands to signal user motion through the wireless transceiver 34, as further described below. In one embodiment, the wireless transceiver 34 can be BLE (Bluetooth® low energy) Shield manufactured by Seed Technology Inc. of Shenzhen, China, though other kinds of wireless transceivers are also possible 34. The microcontroller 31 is also interfaced to the one or more capacitive controls 35, 36 included within or on the straps 12-15, and receives commands from the capacitive controls based on which the microcontroller 31 turns on and off the lights 19-21. In one embodiment, the capacitive controls can be a Lilypad™ Button Board designed by Dr. Leah Buechley and by Sparkfun Electronics Inc. of Boulder, Colo., USA, though other kinds of capacitive controls are possible. The capacitive controls are activated by a physical contact with the user, such as a tap or other kinds of pressure applied by the user to the controls. The activation of the controls 35, 36 commands the microcontroller to provide a signal regarding the user's motions through the lights 19-21. For example, upon the left capacitive control 35, which can be located on the left shoulder strap 12, being activated by the user, the microcontroller 31 turns on the lights 19 forming the left turn signal, and upon the right capacitive control 36 being activated by the user t, the microcontroller 31 turns on the lights 20 forming the right turn signal 20. Similarly, as mentioned above, upon simultaneous activation of both the left 35 and the right 36 capacitive controls from simultaneous pulling of both the left 12 and the right 13 straps, the microcontroller 31 activates the hazard lights signal. In addition, the microcontroller 31 is also interfaced to the navigation lights 14 lights 17-18 described above.

The duration for which the lights 19-21 remain on while providing a particular signal can vary. For example, the compass 33 can sense a completion of a signaled turn by the user, sensing a change of the direction of the user's movements, and the microcontroller 31 can turn off the signal upon being notified that the turn has been completed. Similarly, the lights 21 providing the brake signal can be only on while the user is braking. The duration of the signals can also be regulated by receiving commands to provide other signals. In a further embodiment, the duration of one or more of the signals can be preset.

The microcontroller is also electrically interfaced to a power supply 37, which can be a rechargeable battery. In one embodiment, the battery is a 12 Ah 5 v battery, though other kinds of power supplies 37 are possible. The power supply 37 can also power all other components interfaced to the microcontroller 31. In a further embodiment, the other components can be directly connected to the power apply 37. The power supply 37 is also connected to an inductive charging coil 38, which can receive energy from a second inductive coil (not shown) and use the energy to recharge the power supply 37. In one embodiment, the housing 11 can include a cavity (not shown), and the inductive charging coil can be located next to the cavity. The second inductive coil can be included as part of a hook shaped to couple to the cavity, and the energy can be transferred when the hook is inside the cavity. Thus, a user wanting to recharge the power-supply can leave the bag 10 hanging on the hook.

In addition, a magnet (not shown) can be provided in the housing 11, such as in the cavity, which can help couple the housing to the second inductive coil, which can include a different magnet or a metallic part to which the housing magnet can attach. In a further embodiment, other ways to recharge the power supply 37 are possible. For example, the power supply 37 may be recharged through a wired connection, such as a USB Port. Still other ways to recharge the power supply 37 are possible. In a still further embodiment, the power supply 37 can be a non-rechargeable power-supply 37, such as a non-rechargeable battery that is replaced once the battery's power runs low.

Further, the power supply 37 can be connected to indicator lights (not shown) present on the housing that provide to the user information regarding the charge of the power supply 37. In a further embodiment, the components of the circuitry 30 described above can include multiple power supplies that can power different components of the circuitry separately.

In addition to the power supply 37, the microcontroller 31 is also connected to a toggle switch 39, which can be comprised on a surface of the bag 10 and which allows the circuitry 30 to be turned on and off. In a further embodiment, the circuitry 30 can be turned and off upon the buckle 16 being buckled and unbuckled, with sensors included in the buckle notifying the microcontroller 11 of the buckling and unbuckling.

While the circuitry 30 described above is described as connected via electrical connections, such as wires, in a further embodiment, at least some components of the circuitry 30 can be wirelessly connected to each other, such as through multiple wireless transceivers. The components of the circuitry can be included within the housing 11 or be located on an external surface of the housing 11 such as being attached to the surface of the housing 11. In the embodiment, the physically distant components can have a separate power supply and communicate with the remaining components of the circuitry through wireless transceivers.

As mentioned above, other wearable motion signaling objects are possible besides the bag 10. Thus, in a further embodiment, the circuitry 30 can be a part of a different motion signaling object, such as a jacket. In these embodiments, the circuitry 30 in the wearable object can interact with a user device as further described below with reference to FIGS. 4-6.

The bag 10 can provide signals purely based on data from the motion sensors and commands received from the capacitive controls. However, the wireless transceiver 34 of the bag 10 can also communicate wirelessly with a mobile application and provide the signals based on a route preplanned by the application based on user input in addition to providing signals based on the sensor data and capacitive control commands. FIG. 4 is a functional block diagram showing a system 30 for in-route motion signaling in accordance with one embodiment. The bag 10 wirelessly interacts using the wireless transceiver 34 with a user device 41 associated with the user. While the user device 41 is shown with reference to FIG. 4 as being a mobile phone, the user device 41 can also be other kinds of devices, such as tablets, laptops, portable media players, and other devices capable of executing downloadable applications. Still other kinds of user devices 31 are possible. For example, the user device 41 can be a device that is electrically connected to an internal circuitry of a motor vehicle, such as a motorcycle, and sense turning signals that the user provides through the motorcycle. In the embodiment, the user device 41 can also include sensors that detect the movement of the vehicle, and the user device 41 can transmit commands to the bag 10 based on the sensed motion and the sensed turn signals the user provides through the vehicle.

The user device 41 can include components conventionally found in programmable computing devices, such as a central processing unit, memory, input/output ports, network interfaces, and non-volatile storage, although other components are possible. The device 41 can include one or more modules for carrying out the embodiments disclosed herein. The modules can be implemented as a computer program or procedure written as source code in a conventional programming language and that is presented for execution by the central processing unit as object or byte code. Alternatively, the modules could also be implemented in hardware, either as integrated circuitry or burned into read-only memory components, and the user device 41 can act as a specialized computer. For instance, when the modules are implemented as hardware, that particular hardware is specialized to generate and provide commands to the bag 10 and other computers without the hardware cannot be used for that purpose. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components. For example, the user device 41 can include a global positioning system (GPS) receiver or a receiver of another geolocational system that allows to determine a geographic position of the user device 41. Additionally, the user device 41 includes a wireless transceiver capable of communicating with the wireless transceiver 34 of the bag 10. Still other types of modules, module functions, and hardware are possible.

The user device 41 can execute a mobile application 42, which can be a downloadable application, and can receive user input regarding the user's route. For example, once the user pushes a start button, the application 42 can provide the user a search dialog where the user can enter a destination address. The application 42 can obtain the current location of the user device 32 from the geolocational receiver of the user device 41, and use both locations for obtaining the user's route. For instance, the application 42 can include an API that contacts a commercially available mapping applications (not shown), such as Google® Maps stored on the user device 41, and obtains the route between the two locations and other information, such as turn-by-turn navigation through the application. The mapping application can in turn obtain the route information over an Internetwork 43, such as the Internet or a cellular network, from one or more servers 44 that include map data 45 that the servers 44 can use to plan the route. Other ways to obtain the route information are possible. Upon receipt, the route information can be stored into the memory of the user device 41.

The application 42 monitors the change in the location of the user device 41 and wirelessly transmits to the microcontroller 31 data, such as, commands to signal the user's upcoming movements and provide the user directions for the movements, though other kinds of data are possible. For example, if the user must make a turn to stay on the preplanned route within a predefined distance, such as 500 feet, the application 42 wirelessly commands the microcontroller 31 to show the turn to the user through the navigation lights 17, 18. The user can be either made aware of the distance remaining before the turn when the lights are activated before beginning the ride on the route, such as when the user enters route information into the application 31, or the proximity of the turn can be indicated by the speed of blinking of the navigation lights 17, 18, with the lights 17, 18 blinking faster as the turn approaches. The application 42 can similarly regulate the intensity of vibration of the vibration motors. The application 42 also commands the microcontroller 31 to turn on the lights 19, 20 for the left or the right turn signal a certain time, such as a few seconds, after the navigation lights 17, 18 are activated. Other ways in which the application 42 can interact with the microcontroller 31 are possible.

Further, the application 42 can update the route if the user deviates from the original route. For example, if the user misses a planned turn, the application 42 can update the turn based on the user's new location and provide signals to the microcontroller based on the updated route.

The user can control the application 42 both through the user device 41 and the bag 10. For example, the user can cancel in-route navigation performed by the application 42, including providing signals through the navigation lights 17, 18 and through the lights 19-21, such as pushing one of the capacitive controls 35, 36 for a predetermined amount of time, such as five seconds, though other time intervals are also possible. In addition, the user can override the commands given to the microcontroller 31 by the application 42 using the capacitive controls 35, 36; thus, if the user wants to move in a direction different than the direction programmed into the application 42 and provides the signal through the signal through the capacitive controls 35, 36, the user can keep the bag 10 from signaling the turn.

In addition, the application 42 allows the user to keep track of the user's movements. For example, the application 42 can log travel statistics, such as the distance traveled by the user, the time the route took, and the time and date at which the user travelled the route, and allow the user to view these statistics. Further, the application can communicate with the microcontroller 31 and receive data regarding the state of the charge of the power supply 37 and display this information to the user. Further, the application 42 can communicate with the microcontroller 31 and change the color and intensity of the signals provided by the lights, allowing the user to customize these parameters.

Figure 5:
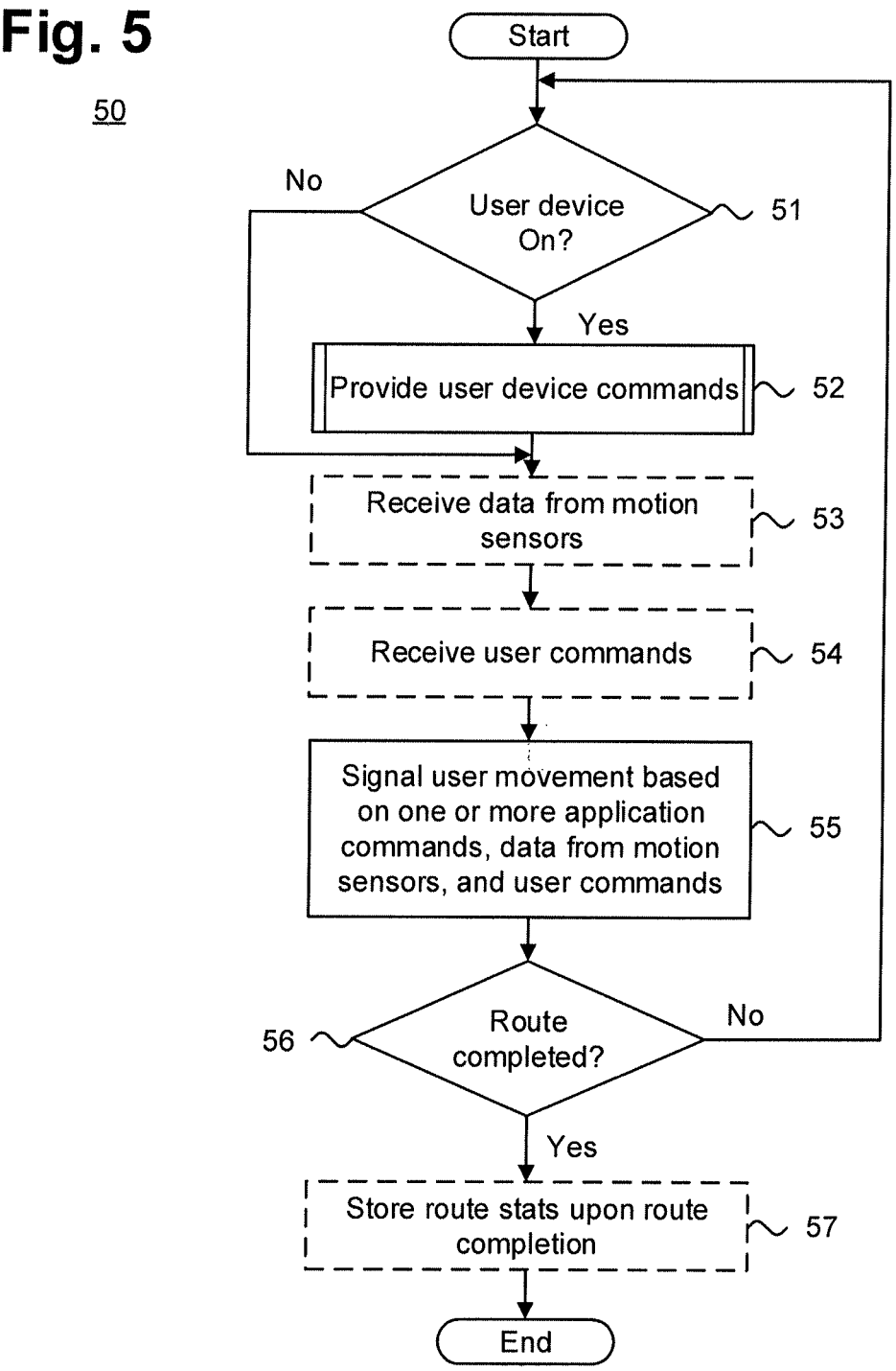
FIG. 5 is a flow diagram showing a method for in-route motion signaling in accordance with one embodiment.

Using both a preplanned route and direct user input through the capacitive controls 35, 36 of the bag 10 provides a flexible way to signal the user's movements without constantly distracting user from the road or restricting the user to a preplanned route. FIG. 5 is a flow diagram showing a method 50 for in-route motion signaling in accordance with one embodiment. Initially, if the user device 41 has been turned on and ready to communicate with the bag 10, such as via a running mobile application 42 (step 51), the user device 41 generates and provides commands to signal user movements to the bag 10 (step 52). The commands can be generated and provided via the mobile application 42, as further described with reference to FIG. 3. Alternatively, if the user device 41 is installed in a motor vehicle and detects the turning signals that the user gives through the motor vehicle, the user device wirelessly commands the bag 10 to show the turning signals. Likewise, if the user device 41 includes motion sensors, such as those described above with reference to FIG. 3, the user device can provide the commands to the bag 10 based on the sensed data.

If the bag 10 includes motion sensors, data from motion sensors, such as the accelerometer 32 and the compass 33, is optionally received by the microcontroller (step 53). Optionally, one or more user commands are received via the capacitive controls 35, 36 (step 54). Such commands can include a command to stop execution of the application 42 or a command to provide one or more of the signals, though other commands are possible.

The microcontroller 31 signals the user's motions through the lights 19-21 and, optionally, navigation lights 17, 18, based on one or more of the commands, sensor data, and user commands (step 55). If the route has been completed, which can be determined based on factors such as the route data in the application 42 or the user powering down the bag 10 (step 56), optionally, the application 42 stores statistics about the trip, such as the distance covered, the time the route took, and the time of the user traveled the route, and present the statistics to the user upon user request (step 57), ending the method 50. If the route has not been completed (step 57), the method returns to step 51 described above.

Figure 6:
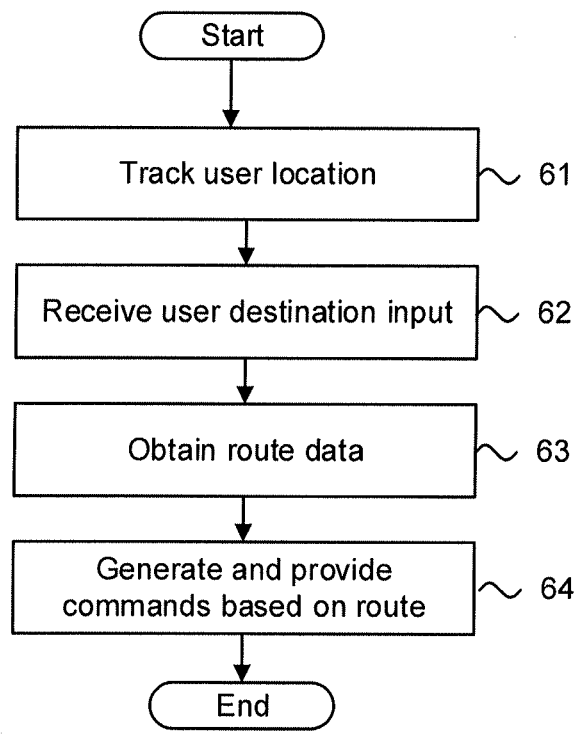
FIG. 6 is a flow diagram showing a routine for providing commands by a user device for use in the method of FIG. 5 in accordance with one embodiment.

Running the mobile application 42 provides one way to generate and provide commands to the bag 10. FIG. 6 is a flow diagram showing a routine for providing commands by the user device 41 for use in the method of FIG. 5 in accordance with one embodiment. A location of the user device 41 is determined and subsequently tracked by the application 42 using the geolocational services of the user device 41, with the location of the user device 41 being considered the location of the user by the application 31 (step 61). User input is the received into the application 42 that includes a destination that the user would like to go to (step 62). Data regarding a route between the locations, which can include turn-by-turn navigation, is obtained based on the user's current location and the destination by the application 42, as described above (step 63). The application 42 generates and transmits commands to the microcontroller based on the route data and the tracked location (step 64), terminating the routine 60.

While the invention has been particularly shown and described as referenced to the embodiments thereof, those skilled in the art will understand that the foregoing and other changes in form and detail may be made therein without departing from the spirit and scope.

What is claimed is:

1. A wearable motion-signaling bag, comprising:
   a housing;
   one or more straps connected to the housing and shaped to be worn by a user;
   one or more lights contacting at least one surface of the housing;
   one or more controls configured to be activated by the user;
   a microcontroller operable to execute under programmable control and interfaced to one or more motion sensors, the controls, and the lights, the microcontroller configured to provide signals regarding motion of the user through the lights based on sensed data from the one or more motion sensors and commands given by the controls when activated; and
   the one or more motion sensors, wherein at least one of:
      the sensors comprise at least one of a compass and a gyroscope and are configured to sense a completion of a turn by a user and the microcontroller turns off a signal for the turn upon the completion being sensed; and
      the sensors comprise an accelerometer configured to sense a speed of the user and a brightness of one or more of the signals varies based on the speed.

2. The wearable motion-signaling bag according to claim 1, wherein the controls are capacitive controls and each of capacitive controls is at least one of comprised on the straps and comprised within the straps.

3. The wearable motion-signaling bag according to claim 1, wherein the signals comprise animated signals.

4. The wearable motion-signaling bag according to claim 3, wherein the animated signals comprise one or more of a left turn signal comprising an arrow pointing left along an external surface of a distal side of the housing, a right turn signal comprising an arrow pointing right along the external surface of the distal surface of the housing, a brake signal comprising a rectangle provided above the left and the right arrows and another rectangle provided simultaneously with the rectangle below the left and the right arrows, a hazard light comprising the left turn signal and the right turn signals, and a safety light comprising a moving light pattern provided by the lights providing the right turn signal, the left turn signal, and the brake signal.

5. The wearable motion-signaling bag according to claim 1, wherein the surface comprises at least one of an external surface of the distal side of the housing and an internal surface of the distal side of the house.

6. The wearable motion-signaling bag according to claim 5, wherein the lights comprise a strip of LED lights removably attached to the internal surface of the distal side of the housing.

7. The wearable motion-signaling bag according to claim 1,
a wireless transceiver interfaced to the microcontroller and configured to receive commands to signal the user's upcoming movements from a user device,
wherein the microcontroller is further configured to provide the signals based on the commands.

8. The wearable motion-signaling bag according to claim 7, further comprising:
one or more additional lights interfaced to the microcontroller and comprised on the straps, wherein the microcontroller provides one or more of the signals to the user regarding the user's movements based on the control commands and the user device commands.

9. The wearable motion-signaling bag according to claim 1, further comprising:
a power supply configured to power the microcontroller, the lights, the wireless transceiver, the sensors, and the controls; and
an inductive charging coil configured to receive energy from a second inductive coil and to recharge the power supply with the energy.

10. The wearable motion-signaling bag according to claim 9, further comprising a cavity formed in the housing shaped to receive a member comprising the second inductive coil.

11. A system for in-route motion signaling, comprising:
a user device, comprising:
a processor configured to execute code, comprising:
a command module configured to generate one or more commands to signal a movement of a user;
a wireless transceiver interfaced to the processor and configured to transmit the commands; and
a motion-signaling object wearable by the user, comprising:
one or more lights;
a wireless transceiver configured to receive the commands from the user device wireless transceiver;
one or more controls configured to be activated by the user;
a microcontroller operable to execute under programmable control and interfaced to the controls, the wireless transceiver, one or more motion sensors, and the lights, the microcontroller configured to provide signals regarding the motion of the user through the lights based on sensed data from the one or more motion sensors, one or more of commands given by the capacitive controls when activated, and the commands from the user device; and
the one or more motion sensors, wherein at least one of:
the sensors comprise at least one of a compass and a gyroscope and are configured to sense a completion of a turn by a user and the microcontroller turns off a signal for the turn upon the completion being sensed; and
the sensors comprise an accelerometer configured to sense a speed of the user and a brightness of one or more of the signals varies based on the speed.

12. The system according to claim 11, wherein the microcontroller identifies a conflict between one or more of the commands from the controls and the user device commands, and provides the signals only based on the conflicting control commands.

13. The system according to claim 11, further comprising:
a memory coupled to the processor and configured to store data regarding a route of the user;
a mobile application executed by the processor, comprising:
a location module configured to track a location of the user device; and
a turn module configured to determine one or more upcoming turns based on the route data and the tracked location; and
a command module configured to generate the user device commands based on the upcoming turns.

14. The system according to claim 13, wherein one of the capacitive control commands comprise a command to stop the execution of the mobile application, the object wireless transceiver transmits the stop command to the user device wireless transceiver, and the processor stops the execution of the mobile application upon receipt of the stop command.

15. The system according to claim 11, further comprising:
a receipt module configured to receive user input comprising a color of the signals provided by the lights; and
a transmission module configured to transmit via the user device wireless transceiver the color to the object wireless transceiver,
wherein the signals provided by the lights are of the transmitted color.

16. A wearable motion-signaling object, comprising:
one or more lights;
one or more controls configured to be activated by a user;
a microcontroller operable to execute under programmable control and interfaced to one or more motion sensors, the controls, and the lights, the microcontroller configured to provide signals regarding motion of the user through the lights based on sensed data from the one or more motion sensors and commands given by the controls when the controls are activated; and
the one or more motion sensors configured to sense a motion of the user, wherein at least one of:
the sensors comprise at least one of a compass and a gyroscope and are configured to sense a completion of a turn by a user and the microcontroller turns off a signal for the turn upon the completion being sensed; and
the sensors comprise an accelerometer configured to sense a speed of the user and a brightness of one or more of the signals varies based on the speed.

\* \* \* \* \*